United States Patent [19]

Adelmann

[11] 3,959,194
[45] May 25, 1976

[54] LESS ABRASIVE COMPOSITION RAILROAD BRAKE SHOE MATERIAL

[75] Inventor: John Charles Adelmann, Littleton, Colo.

[73] Assignee: Johns-Manville Corporation, Denver, Colo.

[22] Filed: May 7, 1975

[21] Appl. No.: 575,306

Related U.S. Application Data

[63] Continuation of Ser. No. 302,464, Oct. 31, 1972, abandoned.

[52] U.S. Cl. .............................. 260/17.2; 51/298 R; 51/299 R; 106/36; 188/251 A; 260/17.4 BB; 260/38; 260/42.37; 260/42.47; 260/846; 260/998.13; 260/DIG. 39
[51] Int. Cl.² ...................... C08K 3/34; C08L 1/02; F16D 69/02
[58] Field of Search ................ 51/298, 299; 106/36; 188/251 A; 260/17.2, 17.4 BB, 38, 42.37, 42.47, 846, 998.13, DIG. 39

[56] References Cited
UNITED STATES PATENTS

| | | | |
|---|---|---|---|
| 2,052,779 | 9/1936 | Lidkea et al. ........................... | 106/36 |
| 3,344,094 | 9/1967 | de Gaugue ........................ | 188/251 A |
| 3,673,276 | 6/1972 | Keller ............................ | 188/251 A |
| 3,684,062 | 8/1972 | Johnson ......................... | 188/251 A |

FOREIGN PATENTS OR APPLICATIONS

| | | | |
|---|---|---|---|
| 561,962 | 8/1958 | Canada ........................... | 188/251 A |

*Primary Examiner*—Donald E. Czaja
*Assistant Examiner*—H. H. Fletcher
*Attorney, Agent, or Firm*—Robert M. Krone; Joseph J. Kelly; James W. McClain

[57] ABSTRACT

Low abrasion, high strength friction materials are described, containing rubber binder, inorganic filler, fiber, and not more than 1% by volume of lead and lead oxide. Organic fillers and phenolic resins may also be present. The materials find particular use as brake shoes for railroad rolling stock which uses wheels of relatively soft steel.

7 Claims, 1 Drawing Figure

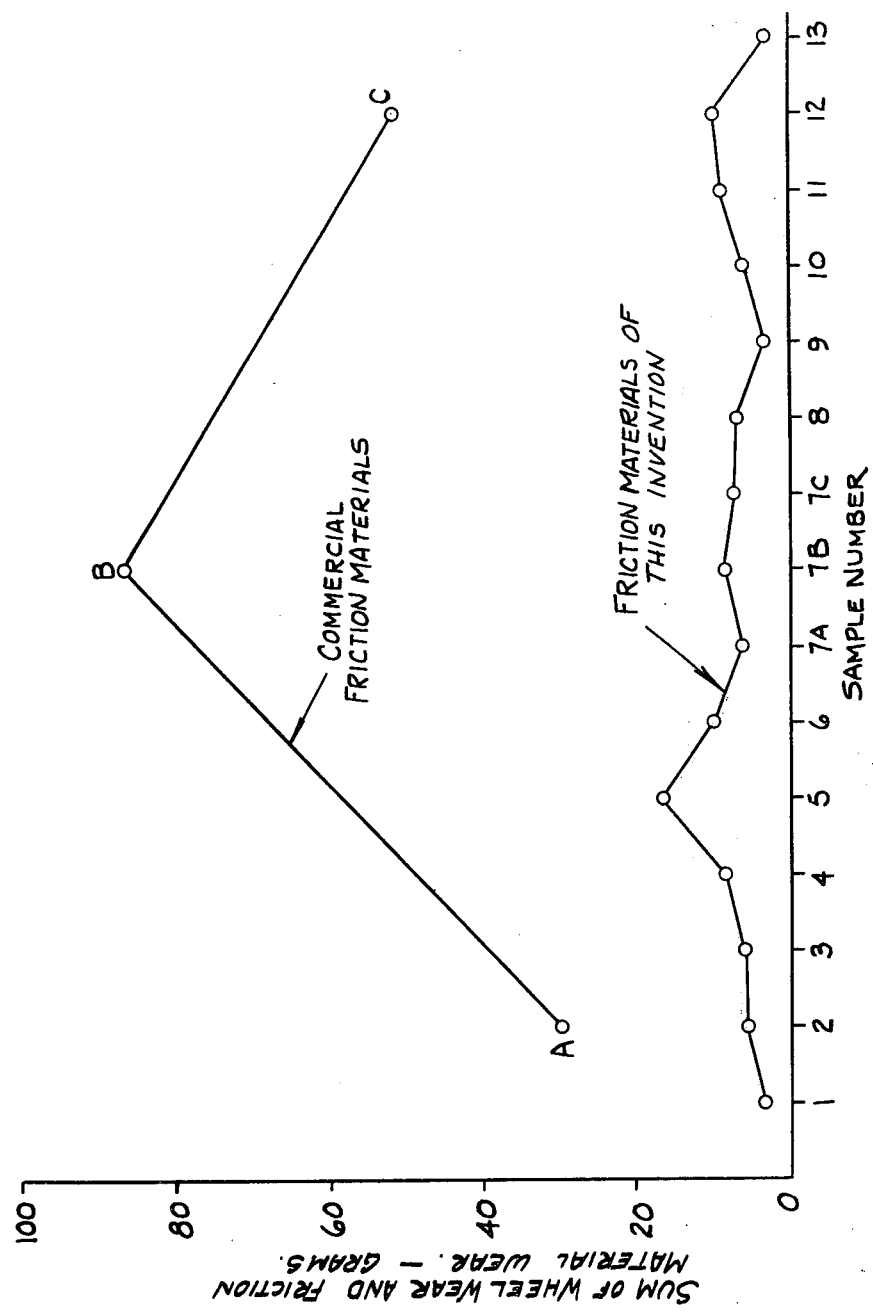

LESS ABRASIVE COMPOSITION RAILROAD BRAKE SHOE MATERIAL

This is a continuation of application Ser. No. 302,464, filed Oct. 31, 1972, and now abandonded.

BACKGROUND OF THE INVENTION

The invention herein relates to friction materials. More particularly, it relates to friction materials having low abrasion which are useful as brake shoes for railroad rolling stock with relatively soft steel wheels.

Brake shoes for railroad brakes have been made of two types of materials. Older American and European railroad cars, and some modern European railroad cars, have brake shoes made of cast iron. Most American rolling stock of recent vintage, however, has composition brake shoes made of highly leaded materials such as those described in U.S. Pat. Nos. 2,686,140; 2,861,964; 3,152,099 and 3,390,113. As noted in these patents, the composition brake shoes offer a number of advantages over the older cast iron shoes.

With softer steel railroad car wheels, however, the composition material brake shoes of the prior art have often proved unsatisfactory, because they are usually quite abrasive. This is particularly true in European countries, where it has been customary to manufacture wheels from softer grades of steel and to forego the heat treating and hardening steps used in the manufacture of most American wheels. Only a few specific formulations have been found to have sufficiently low abrasion for use with the softer steel wheels.

It is therefore an object of this invention to provide a composition material having consistently low abrasive characteristics and suitable for use as brake shoes for railroad cars with relatively soft steel wheels.

SUMMARY OF THE INVENTION

I have now discovered that a consistently low abrasion brake shoe can be manufactured from a composition comprising 3 to 25% by weight of rubber binder, 20 to 70% by weight of inorganic filler, 2 to 12% by weight of fiber and not more than 1% by volume of lead and lead oxides. Preferred embodiments of this composition also include to 5 to 45% by weight of organic filler and 1 to 30% by weight of phenolic resin.

DESCRIPTION OF THE DRAWING

The single FIGURE of the drawing is a graphical comparison of the abrasion and wear resistance characteristics of the compositions of the present invention as compared to equivalent characteristics of the commercial composition brake shoes.

DETAILED DESCRIPTION OF THE INVENTION

The composition of this invention is a material satisfactory for the manufacture of low abrasion railroad brake shoes and similar friction materials. In the past, very few composition brake shoes have had low abrasion properties and those few compositions which did exhibit low abrasion generally possessed other undesirable characteristics such as a reduced resistance to wear. This has forced railroad personnel on those railroads on which soft steel wheels are in use into the unenviable position of having to attempt to strike a balance between high wear rates of the wheels due to the abrasiveness of the brake shoe or high wear rates of the brake shoe itself. Since it has heretofore been impossible to achieve consistently low abrasion in composition brake shoes, the composition materials have generally not been able to compete effectively against the older cast iron brake shoes.

I have discovered a composition material which has consistently low abrasion and is eminently suitable for use as brake shoe friction material for use in association with soft steel railroad car wheels. My novel brake shoe or friction material composition comprises 3 to 25% by weight of rubber binder, 20 to 70% by weight of inorganic filler, 2 to 12% by weight of fiber and a total of not more than 1% by volume of lead and lead oxide, and preferably contains no lead or lead oxide. In other preferred embodiments the composition also contains 5 to 45% by weight of organic filler and 1 to 30% by weight of phenolic resin. Curing and stabilizing additives for the rubber and/or the phenolic resin may also be present. The compositions of my invention provide for an average seven-fold decrease in wheel wear with European steel wheels and in the preferred embodiment containing no lead provide for an eight-fold decrease in European steel wheel wear. Similarly, there is an average nine-fold decrease in brake shoe wear, as compared to present commercial materials.

The rubber binder used in the compositions of this invention may be any natural or synthetic rubber or elastomeric material which may be vulcanized or otherwise cured to form a hard matrix for the remaining components. Preferred rubbers are the butyl rubbers, styrene-butadiene rubbers, and nitrile rubbers. Chlorinated butyl rubber may also be used, as shown in U.S. Pat. No. 3,390,113. A number of varieties of each of these materials are commercially available and are widely described in the literature. Detailed descriptions of the properties of these rubbers will be found in the Vanderbilt Rubber Handbook, published by the R. T. Vanderbilt Company in 1968. The rubber binder will be present as 3 to 25 wt. percent of the composition, and preferably 8 to 20 wt. percent.

Also present in the composition will be one or more inorganic fillers. These may be such materials as graphite, iron oxide, calcium carbonate, zircon, barytes, carbon black and cast iron. Formulations in the past have included lead as an inorganic filler in the form of lead metal or a lead oxide such as litharge. In the present formulation, of course, such a filler would be limited to an amount such that the total lead and lead oxide content of the formulation is less than 1 volume percent. Preferably any lead would be excluded altogether. The inorganic filler may consist of a single material or it may consist of a mixture of two or more of the materials described. The total inorganic filler content will be in the range of from 20 to 70 wt. percent, preferably 35 to 60 wt. percent.

The composition will also contain a fibrous component, which is composed of cellulosic and/or asbestos fibers. The asbestos fibers will normally be of the shorter length, generally including Groups 5–7 as measured by the Quebec Asbestos Mining Association standard grading method. The cellulosic fibers may be natural fibers such as fibers of wood, sisal, jute and the like or may be synthetic fibers such as rayon. Again, the cellulosic fibers will preferably be relatively short fibers. The fibrous component content of the composition will be between 2 and 12 wt. percent, preferably 3 to 9 wt. percent.

The composition will also contain conventional additives which serve to vulcanize and/or stabilize the rubber binder or accelerate its cure. Such materials are conventional and are widely described in the literature, including the aforesaid Vanderbilt Rubber Handbook. In the discussion above I have included them in the percentage concentration of the rubber binder itself, as listed above. If it is desired to calculate the concentration of these components separately, however, they will normally range from about 0.5 to 15 wt. percent of the composition, and preferably 0.5 to 5 wt. percent.

In a preferred embodiment the composition will contain 5 to 45 wt. percent of an organic filler. Organic fillers are normally hard rubber powders, particles or dust, or cashew nut shell oil resin particles. It is common for these materials to be heavily filled with inorganic substances among which, in the past, has often been included lead and/or lead oxide (litharge). As noted above with the inorganic fillers, the lead present in such organic fillers must also be strictly limited and preferably is excluded altogether. While the organic filler is normally present as 5 to 45 wt. percent of the composition it is preferred that it be limited to 15 to 45 wt. percent of the composition.

In another preferred embodiment the composition will also contain 1 to 30% of a phenolic resin as a strengthening or stiffening agent for the rubber matrix. The phenolic resin may be a synthetic resin prepared from conventional organic chemicals such as phenol and formaldehyde. Alternatively, it may be a resin prepared from natural sources of phenol derivatives, such as cashew nut shell oil, which are reacted with aldehydes. Commercial phenolic resins often contain curing agents incorporated in the resin. Where such curing agents are not present in the resin as commercially available, curing agents in small quantities may be added to the composition to effect the cure of the resin. A typical such curing agent is hexamethylenetetramine. The phenolic resin component will be present as 1 to 30 wt. percent of the composition and preferably 2 to 5 wt. percent; when the curing agent is accounted for separately, it will be present as 0.05 to 0.5 wt. percent of the composition, preferably 0.1 to 0.3 wt. percent.

For convenient formulation, the basic components of the composition herein are described as percentages by weight. It will be noted, however, that the lead and lead oxide content is measured as percent by volume. This is necessary because the important consideration in determining a maximum lead content is the amount of lead which will be exposed at the surface of the brake shoe in contact with the steel wheel. A volume percentage designation will remain constant for a given shape and size of brake shoe, despite variations in the actual composition of the shoe. A weight percentage, on the other hand, would vary not only with shoe shape and size, but also according to the weight of the other components present and thus would have to be calculated for each individual composition. Since a weight percentage would vary from composition to composition, the description of the maximum lead content by weight percentage could well result in inaccuracies where the weight of the other components in a particular composition was greater or lesser than the weight of the components in the standard composition for which the maximum value was initially calculated. Since abrasiveness of the brake shoe on the wheel is a factor of the contacting area, however, and therefore of the shape and size of the brake shoe, a definition in the terms of volume percent of total lead and lead oxide content accurately reflects the physical system being considered.

The critical nature of the lead content in the compositions of this invention will be illustrated by the examples below. In each example a disc of the test composition approximately 4 inches in diameter, 1 inch thick, and weighing 850 grams at a specific gravity of 2.5, was prepared and run in a "wheel wear test" in intermittent contact with a disc of a railroad car wheel material or its equivalent, 5 inches in diameter, 1 inch thick, and weighing 1450 ± 20 grams. In the wheel wear test a machine running at a constant speed of 1730 rpm and a constant torque of 185 lb-in. made 240 repeated engagements and disengagements of the friction material disc against the wheel material disc at 2 minute intervals. The discs were held in contact during each engagement for a period of 30 seconds. Between each engagement, cooling water at 100°F was circulated at the back of the wheel material disc in order to bring the bulk temperature down. After the 240 engagements, both the friction material disc and the wheel material disc were weighed to an accuracy of ± 0.1 gram, and the weight after the test was compared with the initial weight of the discs. The difference in weight of each disc was recorded as the material lost through wear.

For tests intended to indicate wear properties of American ralroad car wheels, the wheel discs were made of one or another of the standard wheel steels. These steels are defined by the Association of American Railroads, and are listed as "Class A," "Class B," and "Class C."" "Class B" is the most common type used and can be considered the standard American wheel steel. For the tests intended to indicate wear properties of European railroad car wheels, test discs were made of a gun iron material available under the trademark "Gunite," which closely duplicates the hardness characteristics of the actual steels used in most European railroad car wheels. The Research Brinnell hardness of each type of wheel material is listed in Table I below:

TABLE I

| Metal | Research Brinnell Hardness Number Average |
|---|---|
| Gunite iron | 165 |
| Class A Steel | 265 |
| Class B Steel | 290 |
| Class C Steel | 320 |

The FIGURE in the drawing graphically illustrates the comparison in the abrasiveness and wear resistance of the compositions of this invention as compared to three commercial railroad brake shoe compositions. In the graph the ordinate is a measure of the sum of the total wear of the metal disc (which indicates the abrasiveness of the friction material) and the total wear of the friction material disc (which indicates the resistance of the friction material to wear). The resultant sum therefore takes into account the fact that those few present commercial materials which have low abrasiveness also have low wear resistance, and conversely, many materials which are resistant to wear are also highly abrasive. The upper line in the graph indicates average total wear data from separate wheel wear tests using three commercial brake shoe compositions, designated A, B, and C and Gunite iron discs. All three compositions were of the types described in the aforesaid U.S. patents. Material A contained 6.8 volume percent of lead and lead oxide; material B contained 4.8 volume percent of lead and lead oxide and material C contained 4.0 volume percent of lead and lead oxide.

The lower line in the graph illustrates data from 16 wheel wear tests with Gunite iron discs using 14 different brake shoe compositions within the scope of this invention. The components of each composition are set forth in the example below corresponding to the designated numbers. With the exception of sample 8, which contains 0.7 volume percent of lead as lead powder, the samples illustrated all contain no lead or lead oxide. The rubber matrix in each sample was a styrene butadiene rubber, a butyl rubber, a nitrile rubber or a mixture of two or more of these materials. It will be evident from the FIGURE that the compositions of this invention have the unexpected and highly desirable properties of both low abrasiveness and high resistance to wear, a combination of properties heretofore unobtainable with the materials of the prior art.

In the examples below, all components are shown as percentages by weight of the total composition. Separation of the major types of materials is also made to show the particular components included therein. Total lead and lead oxide content as volume percentage is also shown. For comparative purposes, the wear of both the Gunite iron disc and the friction material disc for the three commercial materials labeled A, B, and C above are shown below in Table II.

TABLE II

| Commercial Friction Material | Gunite Iron Disc wear, grams | Friction Material Disc wear, grams |
| --- | --- | --- |
| A | 15.5 | 14.2 |
| B | 5.5 | 80.6 |
| C | 10.3 | 41.1 |

Example 1

| | | |
| --- | --- | --- |
| Rubber binder | | 13.9% |
| SBR — 1012 styrene butadiene rubber | 13.9% | |
| Phenolic resin | | 3.5% |
| oil-modified two-stage powdered phenolformaldehyde resin | 3.5% | |
| Rubber additives | | 2.7% |
| sulfur | 1.4% | |
| 2-mercaptobenzothiazole | 0.1% | |
| tetramethylthiuram disulfide | 0.1% | |
| zinc oxide | 1.0% | |
| phenyl-beta-naphthylamine | 0.1% | |
| Inorganic filler | | 41.7% |
| red iron oxide | 41.7% | |
| Organic filler | | 34.7% |
| hard carbon filler | 27.8% | |
| cashew nut shell oil particles | 6.9% | |
| Fiber | | 3.5% |
| cellulosic fiber | 3.5% | |

The composition contained no lead.

In the wheel wear test, with Gunite iron, the material loss of the metal disc was 0.8 grams and of the composition disc was 2.5 grams.

Example 2

| | | |
| --- | --- | --- |
| Rubber binder | | 11.3% |
| SBR — 1012 styrene butadiene rubber | 11.3% | |
| Phenolic resin | | 2.3% |
| oil-modified two-stage powdered phenolformaldehyde resin | 2.3% | |
| Rubber additives | | 1.5% |
| sulfur | 0.6% | |
| 2-mercaptobenzothiazole | 0.1% | |
| tetramethylthiuram disulfide | 0.1% | |
| zinc oxide | 0.6% | |
| phenyl-beta-naphthylamine | 0.1% | |
| Inorganic fillers | | 45.3% |
| barytes | 11.3% | |

Example 2-continued

| | | |
| --- | --- | --- |
| red iron oxide | 34.0% | |
| Organic fillers | | 34.0% |
| hard carbon filler | 22.7% | |
| cashew nut shell oil particles | 11.3% | |
| Fiber | | 5.7% |
| cellulosic fiber | 5.7% | |

The composition contained no lead.

In the wheel wear test, with Gunite iron, the material loss of the metal disc was 0.3 grams and of the composition disc was 5.4 grams.

Example 3

| | | |
| --- | --- | --- |
| Rubber binder | | 6.0% |
| SBR — 1012 styrene butadiene rubber | 6.0% | |
| Phenolic resin | | 3.2% |
| liquid resin derived from cashew nut shell oil and containing 0.2% hexamethylene tetramine | 3.2% | |
| Rubber additives | | 4.8% |
| sulfur | 2.4% | |
| zinc oxide | 2.4% | |
| Inorganic fillers | | 48.0% |
| graphite | 8.0% | |
| soft iron powder | 48.0% | |
| Organic filler | | 30.0% |
| hard carbon filler | 30.0% | |
| Fiber | | 8.0% |
| cellulosic fiber | 8.0% | |

The composition contained no lead.

In the wheel wear test, with Gunite iron, the material loss of the metal disc was 1.0 grams and of the composition disc was 4.8 grams.

Example 4

| | | |
| --- | --- | --- |
| Rubber binder | | 12.0% |
| SBR — 1012 styrene butadiene rubber | 12.0% | |
| Phenolic resin | | 2.4% |
| oil-modified two-stage powdered phenolformaldehyde resin | 2.4% | |
| Rubber additives | | 1.5% |
| sulfur | 0.6% | |
| 2-mercaptobenzothiazole | 0.1% | |
| tetramethylthiuram disulfide | 0.1% | |
| zinc oxide | 0.6% | |
| phenyl-beta-naphthylamine | 0.1% | |
| Inorganic fillers | | 60.0% |
| G-120 cast iron | 42.0% | |
| barytes | 6.0% | |
| red iron oxide | 12.0% | |
| Organic fillers | | 18.0% |
| hard carbon filler | 12.0% | |
| cashew nut shell oil particles | 6.0% | |
| Fiber | | 6.0% |
| cellulosic fiber | 6.0% | |

The composition contained no lead.

In the wheel wear test, with Gunite iron, the material loss of metal disc was 1.0 grams and of the composition disc was 7.4 grams.

Example 5

| | | |
| --- | --- | --- |
| Rubber binder | | 12.0% |
| SBR — 1012 styrene butadiene rubber | 12.0% | |
| Phenolic resin | | 2.4% |
| oil-modified two-stage powdered phenolformaldehyde resin | 2.4% | |
| Rubber additives | | 1.5% |
| sulfur | 0.6% | |
| 2-mercaptobenzothiazole | 0.1% | |
| tetramethylthiuram disulfide | 0.1% | |
| zinc oxide | 0.6% | |
| phenyl-beta-naphthylamine | 0.1% | |
| Inorganic fillers | | 60.0% |
| barytes | 6.0% | |

Example 5-continued

| | | |
|---|---|---|
| red iron oxide | 12.0% | |
| soft iron powder | 42.0% | |
| Organic fillers | | 18.0% |
| hard carbon filler | 12.0% | |
| cashew nut shell oil particles | 6.0% | |
| Fiber | | 6.0% |
| cellulosic fiber | 6.0% | |

This composition contained no lead.

In the wheel wear test, with Gunite iron, the material loss of the metal disc was 1.5 grams and of the composition disc was 15.1 grams.

Example 6

| | | |
|---|---|---|
| Rubber binder | | 12.8% |
| SBR — 1012 styrene butadiene rubber | 12.8% | |
| Phenolic resin | | 2.6% |
| oil-modified two-stage powdered phenolformaldehyde resin | 2.6% | |
| Rubber additives | | 1.5% |
| sulfur | 0.6% | |
| 2-mercaptobenzothiazole | 0.1% | |
| tetramethylthiuram disulfide | 0.1% | |
| zinc oxide | 0.6% | |
| phenyl-beta-naphthylamine | 0.1% | |
| Inorganic fillers | | 51.1% |
| barytes | 6.4% | |
| soft iron powder | 44.7% | |
| Organic fillers | | 24.8% |
| ground coal | 12.8% | |
| hard carbon filler | 12.8% | |
| Fiber | | 6.4% |
| cellulosic fiber | 6.4% | |

This composition contained no lead.

In the wheel wear test, with Gunite iron, the material loss of the metal disc was 0.5 grams and of the composition disc was 9.5 grams.

Example 7

| | | |
|---|---|---|
| Rubber binder | | 10.0% |
| SBR — 1012 styrene butadiene rubber | 10.0% | |
| Phenolic resin | | 2.2% |
| oil-modified two-stage powdered phenolformaldehyde resin | 2.2% | |
| Rubber additives | | 1.6% |
| sulfur | 0.4% | |
| 2-mercaptobenzothiazole | 0.1% | |
| tetramethylthiuram disulfide | 0.1% | |
| zinc oxide | 0.9% | |
| phenyl-beta-naphthylamine | 0.1% | |
| Inorganic fillers | | 38.3% |
| G-120 cast iron | 33.3% | |
| barytes | 5.0% | |
| Organic fillers | | 36.7% |
| hard carbon filler | 10.0% | |
| hard rubber dust | 26.7% | |
| Fiber | | 11.1% |
| 7D asbestos | 11.1% | |

The composition contained no lead.

In the wheel wear test, with Gunite iron, in a sequence of three tests, each with a different disc of the above composition and a different Gunite iron disc, the metal discs lost 1.1, 1.3 and 0.9 grams respectively and the composition discs lost 4.9, 7.1 and 6.1 grams respectively.

Example 8

| | | |
|---|---|---|
| Rubber binder | | 9.6% |
| SBR — 1012 styrene butadiene rubber | 9.6% | |
| Phenolic resin | | 2.0% |
| oil-modified two-stage powdered phenolformaldehyde resin | 2.0% | |
| Rubber additives | | 1.6% |
| sulfur | 0.4% | |
| 2-mercaptobenzothiazole | 0.1% | |
| tetramethylthiuram disulfide | 0.1% | |
| zinc oxide | 0.9% | |
| phenyl-beta-naphthylamine | 0.1% | |
| Inorganic fillers | | 36.7% |
| G-120 cast iron | 31.9% | |
| barytes | 4.8% | |
| Organic fillers | | 35.1% |
| hard carbon filler | 9.6% | |
| hard rubber dust | 25.5% | |
| Fiber | | 10.6% |
| 7D asbestos | 10.6% | |
| Lead | | 4.3% |
| powdered lead metal | 4.3% | |

The total lead content was 0.7 volume percent, all elemental lead.

In the wheel wear test, with Gunite iron, the material loss of metal disc was 3.8 grams and of the composition disc was 3.0 grams.

Example 9

| | | |
|---|---|---|
| Rubber binder | | 12.8% |
| SBR — 1012 styrene butadiene rubber | 12.8% | |
| Phenolic resin | | 2.6% |
| oil-modified two-stage powdered phenolformaldehyde resin | 2.6% | |
| Rubber additives | | 1.5% |
| sulfur | 0.6% | |
| 2-mercaptobenzothiazole | 0.1% | |
| tetramethylthiuram disulfide | 0.1% | |
| zinc oxide | 0.6% | |
| Inorganic fillers | | 57.5% |
| G-120 cast iron | 44.7% | |
| barytes | 6.4% | |
| red iron oxide | 6.4% | |
| Organic fillers | | 19.2% |
| hard carbon filler | 6.4% | |
| cashew nut shell oil particles | 12.8% | |
| Fiber | | 6.4% |
| cellulosic fiber | 6.4% | |

This composition contained no lead.

In the wheel wear test, with Gunite iron, the material loss of the metal disc was 1.1 grams and of the composition disc was 1.9 grams.

Example 10

| | | |
|---|---|---|
| Rubber binder | | 10.7% |
| SBR — 1012 styrene butadiene rubber | 10.7% | |
| Phenolic resin | | 2.1% |
| oil-modified two-stage powdered phenolformaldehyde resin | 2.1% | |
| Rubber additives | | 1.3% |
| sulfur | 0.5% | |
| 2-mercaptobenzothiazole | 0.1% | |
| tetramethylthiuram disulfide | 0.1% | |
| zinc oxide | 0.5% | |
| phenyl-beta-naphthylamine | 0.1% | |
| Inorganic fillers | | 64.3% |
| G-120 cast iron | 37.5% | |
| barytes | 21.4% | |
| red iron oxide | 5.4% | |
| Organic fillers | | 16.1% |
| hard carbon filler | 5.4% | |
| cashew nut shell oil particles | 10.7% | |
| Fiber | | 5.4% |
| cellulosic fiber | 5.4% | |

This composition contained no lead.

In the wheel wear test, with Gunite iron the material loss of the metal disc was 1.9 grams and of the composition disc was 3.8 grams.

Example 11

| | | |
|---|---|---|
| Rubber binder | | 10.7% |
| SBR — 1012 styrene butadiene rubber | 10.7% | |

Example 11-continued

| | | |
|---|---|---|
| Phenolic resin | | 2.1% |
| oil-modified two-stage powdered | | |
| phenolformaldehyde resin | 2.1% | |
| Rubber additives | | 1.3% |
| sulfur | 0.5% | |
| 2-mercaptobenzothiazole | 0.1% | |
| tetramethylthiuram disulfide | 0.1% | |
| zinc oxide | 0.5% | |
| phenyl-beta-naphthylamine | 0.1% | |
| Inorganic fillers | | 64.3% |
| G-120 cast iron | 37.5% | |
| barytes | 5.4% | |
| red iron oxide | 21.4% | |
| Organic fillers | | 16.1% |
| hard carbon filler | 5.4% | |
| cashew nut shell oil particles | 10.7% | |
| Fiber | | 5.4% |
| cellulosic fiber | 5.4% | |

This composition contained no lead.

In the wheel wear test, with Gunite iron, the material loss of metal disc was 2.2 grams and of the composition disc was 6.5 grams.

Example 12

| | | |
|---|---|---|
| Rubber binder | | 9.2% |
| SBR — 1012 styrene butadiene rubber | 9.2% | |
| Phenolic resin | | 1.8% |
| oil-modified two-stage powdered phenolformaldehyde resin | 1.8% | |
| Rubber additives | | 1.3% |
| sulfur | 0.5% | |
| 2-mercaptobenzothiazole | 0.1% | |
| tetramethylthiuram disulfide | 0.1% | |
| zinc oxide | 0.5% | |
| phenyl-beta-naphthylamine | 0.1% | |
| Inorganic fillers | | 69.3% |
| G-120 cast iron | 32.3% | |
| barytes | 18.5% | |
| red iron oxide | 18.5% | |
| Organic fillers | | 13.8% |
| hard carbon filler | 4.6% | |
| cashew nut shell oil particles | 9.2% | |
| Fiber | | 4.6% |
| cellulosic fiber | 4.6% | |

This composition contained no lead.

In the wheel wear test, with Gunite iron, the material loss of the metal disc was 1.9 grams and of the composition disc was 7.8 grams.

Example 13

| | | |
|---|---|---|
| Rubber binder | | 13.2% |
| SBR — 1012 styrene butadiene rubber | 13.2% | |
| Phenolic resin | | 2.6% |
| oil-modified two-stage powdered phenolformaldehyde resin | 2.6% | |
| Rubber additives | | 1.7% |
| sulfur | 0.7% | |
| 2-mercaptobenzothiazole | 0.1% | |
| tetramethylthiuram disulfide | 0.1% | |
| zinc oxide | 0.7% | |
| phenyl-beta-naphthylamine | 0.1 | |
| Inorganic fillers | | 56.1% |
| G-120 cast iron | 46.2% | |
| barytes | 6.6% | |
| calcium carbonate | 3.3% | |
| Organic fillers | | 19.8% |
| hard carbon filler | 6.6% | |
| cashew nut shell oil particles | 13.2% | |
| Fiber | | 6.6% |
| cellulosic fiber | 6.6% | |

This composition contained no lead.

In the wheel wear test, with Gunite iron, the material loss of the metal disc was 1.4 grams and of the composition disc was 1.5 grams.

In order to illustrate the reduced abrasiveness of the materials of this composition, the wheel wear tests of the following two examples were conducted. In each of these tests a similar composition was used as the friction material, with the only major difference between the two being that in Example 14 the composition contained lead metal and litharge while in Example 15 the lead and litharge were replaced by an equivalent amount of red iron oxide. To illustrate that the comparative abrasiveness values are not limited to the softer railroad car wheels, the metal discs used in the tests were Class B steel.

EXAMPLE 14

A composition disc was prepared from the following components:

| | | |
|---|---|---|
| Rubber binder | | 7.5% |
| SBR — 1012 styrene butadiene rubber | 5.0% | |
| "Hycar 1411" nitrile rubber powder | 2.5% | |
| Phenolic resin | | 3.8% |
| oil-modified two-stage powdered phenolformaldehyde resin | 3.8% | |
| Rubber additives | | 13.0% |
| sulfur | 3.0% | |
| zinc oxide | 10.0% | |
| Inorganic fillers | | 45.0% |
| G-120 cast iron | 30.0% | |
| furnace black | 10.0% | |
| graphite | 5.0% | |
| Fiber | | 5.8% |
| 7D asbestos | 5.8% | |
| Lead | | 25.0% |
| powdered lead metal | 5.0% | |
| litharge | 20.0% | |

The total lead and lead oxide content was 8.5 volume percent, including 5.0 volume percent elemental lead.

In the wheel wear test, with Class B steel, the steel disc lost 16.4 grams of metal.

EXAMPLE 15

As a direct comparison to the lead containing composition shown in Example 14, a composition disc of the following material was prepared. In this material the principal change is the substitution of red iron oxide and cast iron for lead:

| | | |
|---|---|---|
| Rubber binder | | 8.4% |
| SBR — 1012 styrene butadiene rubber | 5.6% | |
| "Hycar 1411" nitrile rubber powder | 2.8% | |
| Phenolic resin | | 4.2% |
| oil-modified two-stage powdered phenolformaldehyde resin | 4.2% | |
| Rubber additives | | 14.8% |
| sulfur | 3.4% | |
| zinc oxide | 11.4% | |
| Inorganic fillers | | 66.1% |
| G-120 cast iron | 34.0% | |
| furnace black | 11.4% | |
| graphite | 5.7% | |
| red iron oxide | 15.0% | |
| Fiber | | 6.5% |
| 7D asbestos | 6.5% | |

The composition contained no lead.

In the wheel wear test, with Class B steel, the steel disc lost 4.5 grams of metal. It will immediately be evident that removal of the lead from the composition substantially reduced the abrasiveness of the brake shoe composition and decreased wheel wear by a factor of approximately four.

EXAMPLE 16

In order to illustrate the improved abrasive properties of the compositions of this invention with the various classes of American steel wheels, a series of wheel wear tests were made. In these tests, friction material discs made of the brake shoe material of Example 1 were compared with the three commercial materials described above and labeled A, B, and C. A series of runs were made with the commercial materials and the average value of metal loss from these various classes of steel wheels were determined. Comparative runs with the same classes of steel were then made for the materials of Example 1. The data derived from this series of tests is presented in the table below:

| Steel Class | Steel Wear, Grams Commercial Brake Shoes, average | Brake Shoes of Example 1 |
| --- | --- | --- |
| A | 5.3 | 0.4 |
| B | 4.8 | 0.6, 0.1 |
| C | 6.4 | 0.2 |

What is claimed is:

1. An improved low abrasion lead free friction material comprising, in approximate percent by weight:

| | |
| --- | --- |
| curable rubber binder | 8 – 20% |
| phenolic resin | 2 – 5% |
| lead-free inorganic filler | 35 – 60% |
| lead-free organic filler | 15 – 45% |
| fiber | 3 – 9%. |

2. The improved lead-free friction material of claim 1 wherein said curable rubber binder comprises a rubber selected from the group consisting of butyl rubber, chlorinated butyl rubber, styrene-butadiene rubber, and nitrile rubber.

3. A lead-free friction material composition comprising, in percent by weight:

| | |
| --- | --- |
| curable rubber binder | 13.9% |
| phenolic resin | 3.5% |
| rubber additives | 2.7% |
| inorganic filler | 41.7% |
| organic filler | 34.7% |
| fiber | 3.5%. |

4. A lead-free friction material composition comprising, in percent by weight:

| | |
| --- | --- |
| Curable rubber binder | 6.0% |
| phenolic resin | 3.2% |
| rubber additives | 4.8% |
| inorganic fillers | 48.0% |
| organic fillers | 30.0% |
| fiber | 8.0%. |

5. A lead-free friction material composition comprising, in percent by weight;

| | |
| --- | --- |
| curable rubber binder | 12.8% |
| phenolic resin | 2.6% |
| rubber additives | 1.5% |
| inorganic fillers | 57.5% |
| organic fillers | 19.2% |
| fiber | 6.4%. |

6. An improved low abrasion lead free friction material comprising in approximate per cent by weight:

| | |
| --- | --- |
| curable rubber binder | 8 – 20% |
| phenolic resin | 2 – 5% |
| lead-free inorganic filler | 35 – 60% |
| lead-free organic filler | 15 – 45% |
| fiber | 2 – 12%. |

7. The improved lead-free friction material of claim 6 wherein said curable rubber binder comprises a rubber selected from the group consisting of butyl rubber, chlorinated butyl rubber, styrene-butadiene rubber, and nitrile rubber.

* * * * *